United States Patent
Prasad et al.

(10) Patent No.: US 9,697,828 B1
(45) Date of Patent: Jul. 4, 2017

(54) KEYWORD DETECTION MODELING USING CONTEXTUAL AND ENVIRONMENTAL INFORMATION

(71) Applicant: Amazon Technologies, Inc., Reno, NV (US)

(72) Inventors: Rohit Prasad, Acton, MA (US); Kenneth John Basye, Sutton, MA (US); Spyridon Matsoukas, Hopkinton, MA (US); Rajiv Ramachandran, Seattle, WA (US); Shiv Naga Prasad Vitaladevuni, Cambridge, MA (US); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/311,163

(22) Filed: Jun. 20, 2014

(51) Int. Cl.
   *G10L 15/18* (2013.01)

(52) U.S. Cl.
   CPC .................... *G10L 15/18* (2013.01)

(58) Field of Classification Search
   None
   See application file for complete search history.

(56) References Cited

U.S. PATENT DOCUMENTS

| | | | | |
|---|---|---|---|---|
| 7,225,125 B2* | 5/2007 | Bennett | G06F 17/3043 | 704/233 |
| 7,860,722 B1* | 12/2010 | Chow | H04M 3/2281 | 379/88.02 |
| 8,294,763 B2* | 10/2012 | Cheng | G06K 9/00771 | 348/143 |
| 9,142,215 B2* | 9/2015 | Rosner | G10L 15/222 | |
| 2002/0087307 A1* | 7/2002 | Lee | G06Q 30/06 | 704/233 |
| 2002/0135618 A1* | 9/2002 | Maes | G06F 3/0481 | 715/767 |
| 2003/0125943 A1* | 7/2003 | Koshiba | G10L 15/20 | 704/238 |
| 2004/0030552 A1* | 2/2004 | Omote | G10L 15/063 | 704/245 |
| 2004/0059576 A1* | 3/2004 | Lucke | G10L 15/07 | 704/256.7 |
| 2004/0230637 A1* | 11/2004 | Lecoueche | G10L 15/20 | 709/200 |
| 2006/0053009 A1* | 3/2006 | Jeong | G10L 15/30 | 704/234 |
| 2006/0247927 A1* | 11/2006 | Robbins | H03G 3/32 | 704/225 |

(Continued)

*Primary Examiner* — Pierre-Louis Desir
*Assistant Examiner* — Jonathan Kim
(74) *Attorney, Agent, or Firm* — Knobbe, Martens, Olson & Bear, LLP

(57) ABSTRACT

Features are disclosed for detecting words in audio using environmental information and/or contextual information in addition to acoustic features associated with the words to be detected. A detection model can be generated and used to determine whether a particular word, such as a keyword or "wake word," has been uttered. The detection model can operate on features derived from an audio signal, contextual information associated with generation of the audio signal, and the like. In some embodiments, the detection model can be customized for particular users or groups of users based usage patterns associated with the users.

27 Claims, 5 Drawing Sheets

(56) References Cited

U.S. PATENT DOCUMENTS

| | | | |
|---|---|---|---|
| 2009/0018832 A1* | 1/2009 | Mukaigaito | G10L 15/1815 704/251 |
| 2010/0223056 A1* | 9/2010 | Kadirkamanathan | G10L 15/02 704/235 |
| 2011/0119059 A1* | 5/2011 | Ljolje | G10L 15/07 704/244 |
| 2011/0251984 A1* | 10/2011 | Nie | G06F 17/30731 706/18 |
| 2012/0016671 A1* | 1/2012 | Jaggi | G10L 15/22 704/235 |
| 2013/0332165 A1* | 12/2013 | Beckley | G10L 17/04 704/246 |
| 2013/0339028 A1* | 12/2013 | Rosner | G10L 15/222 704/275 |
| 2014/0006825 A1* | 1/2014 | Shenhav | G06F 1/3206 713/323 |
| 2014/0039888 A1* | 2/2014 | Taubman | H04M 1/72572 704/235 |
| 2014/0163978 A1* | 6/2014 | Basye | G10L 15/28 704/233 |
| 2014/0274212 A1* | 9/2014 | Zurek | H04M 1/6041 455/563 |
| 2015/0046157 A1* | 2/2015 | Wolff | G10L 15/22 704/231 |
| 2015/0127594 A1* | 5/2015 | Parada San Martin | G06N 3/0454 706/16 |
| 2015/0302855 A1* | 10/2015 | Kim | G10L 17/22 704/275 |

* cited by examiner

KEYWORD DETECTION MODELING USING CONTEXTUAL AND ENVIRONMENTAL INFORMATION

BACKGROUND

Computing devices can be used to detect particular words or phrases in audio data (e.g., "wake" words or other keywords or phrases spoken to initiate interaction with the computing device). In a typical implementation, a computing device can continuously monitor an input stream or receive a batch of input data. This input stream may be, for example, an audio stream from a microphone. The computing device can determine whether a portion of the input stream is likely to contain information corresponding to the word or phrase to be detected. For example, the computing device can make a preliminary determination as to whether a particular portion of the input stream includes any speech at all. Once the computing device has made this preliminary determination, the computing device can then perform other processing, such as automatic speech recognition ("ASR"), to determine which words or phrases are present in the input stream in order to determine whether the particular word or phrase to be detected is present. In some cases, the computing device may detect evidence of a particular word or phrase in an input stream without actually decoding or recognizing specific words or phrases using ASR. For example, the computing device may use a classifier that accepts input features derived from the input stream and determines whether the input stream is likely to include the word or phrase.

A user's experience with the above detection system can be defined in terms of performance latencies and detection errors. These can include false acceptances and false rejections. False acceptances occur when the detection system erroneously hypothesizes from the input data that the user is trying to initiate communication with the computing device. False rejections occur when the detection system fails to respond to user communication directed at the computing device. Detection systems may use the concept of a confidence score when detecting the target item, object, or pattern. Higher confidence in the accuracy of the detection or rejection can be reflected by a higher confidence score, while lower confidence in the accuracy of the detection or rejection can be reflected by a lower confidence score.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
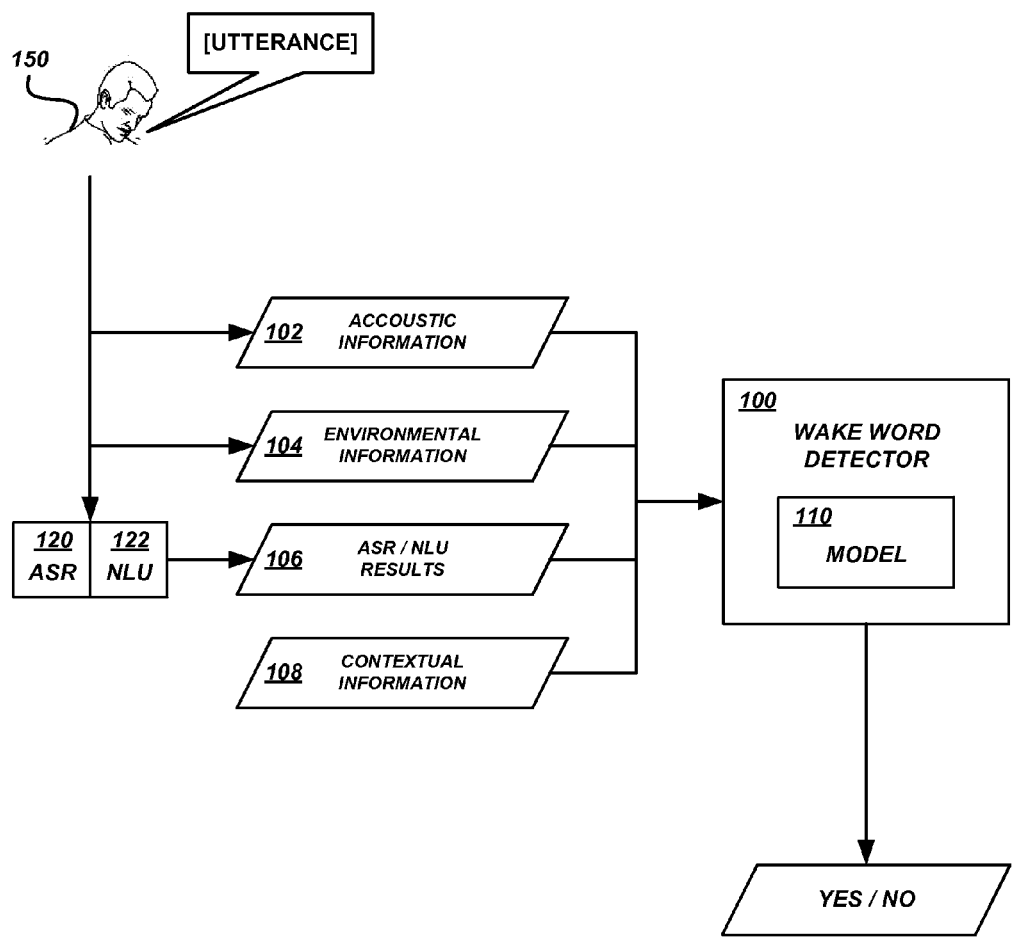
FIG. 1 is a diagram of illustrative inputs to a statistical classifier for detecting wake words in audio input.

The present disclosure is directed to improving the ability of keyword detection systems to determine whether audio input includes a keyword. Accurate keyword detection may be of particular importance in a system that uses a keyword as a trigger for certain features. For example, some computing devices may allow a user to control the device using spoken commands without first requiring any physical interaction (e.g., button press, graphical user interface interaction) to indicate that the user is going to address the system verbally. The device may monitor an input source, such as a stream of audio data from a microphone, and detect the presence of a particular keyword in the audio stream. A user may speak the keyword to indicate that the user is going to address the device using spoken commands. Such a keyword may be referred to as a wake word. If the wake word detection system used by the device produces too many false wake word detections, then the user experience may be negatively affected because the system may take actions or perform other processing at times when the user has not spoken the wake word. If the detection system used by the device produces too many false rejections, then the user experience may be negatively affected because the system may not take action even when the user has spoken the wake word.

Some conventional wake word detection systems use classifiers trained to detect a keyword in an audio signal based on the presence of acoustic features of the keyword in the audio signal. However, such classifiers may not provide an acceptable or desired level of performance in certain conditions, such as noisy environments, ongoing conversations between users, etc. In such conditions, the wake word detection system may produce an elevated number of false rejections or false detections, depending upon the configuration of the system.

Aspects of the present disclosure relate to a wake word detection system trained to use a variety of information in addition to acoustic features of a wake word in an audio signal in order to determine whether the wake word is present in the audio signal. In this way, the wake word detection system (also referred to herein as a "wake word detector" for convenience) can make a holistic determination regarding the presence of a wake word in an audio signal, rather than a determination based solely on acoustic properties of a wake word. As a result, the wake word detector can avoid false detections when it is likely that the user is sleeping or speaking to another person rather than the device, when no recognizable intent has been spoken, when the environment is exceptionally noisy, etc.

In some embodiments, the wake word detector can use acoustic features extracted from an input audio signal, environmental features extracted from the input audio signal, lexical information generating using the input audio signal or a subsequent audio signal (e.g., speech recognition results), linguistic information generated using the audio input signal or a subsequent audio signal (e.g., natural language understanding results), contextual information that is independent of the input audio signal, some combination thereof, etc. With respect to acoustic features, the wake word detector can use information regarding the acoustic properties of the utterance, such as prosody, energy, speaking rate, and the like. With respect to environmental features, the wake word detector can use information regarding the noise level of the environment, acoustic properties of the environment, the distance between the user and the microphone, etc. With respect to speech recognition results, the wake word detector can use the top or n-best recognitions (e.g., transcriptions) generated by an automatic speech recognition ("ASR") system using the input audio signal. With respect to natural language understanding ("NLU") results, the wake word detector can use the top or n-best interpretations (e.g., user intents) generated by an NLU system. With respect to contextual information, the wake word detector can use information regarding the current time of day, the current date, the geographic location of the device, the orientation of the microphone with respect to the user (e.g., if the microphone is integrated into a mobile phone, then information indicating that the user is holding or moving the phone may be used), and the like. Illustratively, some or all of the information described above may be input into (or generated by) the wake word detector as input features, and the wake word detector can determine, using a statistical model trained on such features, whether the wake word has been spoken.

Additional aspects of the present disclosure relate to the use of multiple (e.g., two or more) wake word detectors in order to achieve greater wake word detection accuracy than a single wake word detector. The use of multiple wake word detectors in series (e.g., cascade implementation) can provide a desired level of detection accuracy without a substantial user-perceived increase in overall detection latency. In some embodiments, a user device may include a wake word detector that properly rejects a substantial majority of true negative samples (e.g., the wake word detector may reject >90% of input audio signals that do not include the wake word). The audio signals in which the wake word detector of the user device does detect the wake word may be provided to a network-based speech processing system which has its own wake word detector. In this implementation, the wake word detector at the network-based speech processing system may be referred to as the "server-side wake word detector," and the wake word detector at the user device may be referred to as the "client-side wake word detector." The server-side wake word detector may have access to a substantial amount of computing resources (e.g., processor capacity, memory, etc.), and can therefore perform processing that is more complex and resource intensive that the client-side wake word detector. Such processing may provide substantially better accuracy than the client-side wake word detector without adding substantial user-perceived latency to the overall wake word detection process. For example, the server-side wake word detector may use accurate yet resource-intensive detection techniques to reject a substantial majority of the false detections produced by the client-side wake word detector. In this way, the user may obtain the benefit of both a relatively fast client-side wake word detector and also a powerful server-side wake word detector that closes the audio stream to the server for most or all of the false detections generated by the fast client-side wake word detector.

Further aspects of the present disclosure relate to the application of probabilistic logic to wake word detection. Probabilistic logic provides a principled framework for incorporating common sense reasoning and domain knowledge into the model used by the wake word detector. The reasoning can be expressed in terms of logic rules, and inference can be performed probabilistically to allow for mutually inconsistent and incorrect rules. For example, one set of logic rules may not trigger detection of a wake word at night between 10:00 PM and 2:00 AM unless there is consistent loud background music/speech, such as a party, and wake word detection confidence (based on acoustic features of the audio signal) exceeds a high threshold. As another example, a set of logic rules may trigger detection of a wake word at night between 2:00 AM and 4:00 AM only when wake word detection confidence (based on acoustic features of the audio signal) exceeds a very high threshold in comparison with the threshold that is used during daytime. In this way, wake word detectors may use contextual and environmental information to obtain the benefits described above, while also providing the ability to generate or alter wake word detection logic more quickly and easily than would be the case with a statistical model alone.

Still further aspects of the present disclosure relate to the generation and use of personalized or otherwise customized models for wake word detectors. Information regarding the way a particular user or group of users use wake word enabled systems may be collected. This information may be used to train models that are optimized for the ways in which the target user or users use the system. For example, a generalized model may result in a substantial percentage of potential wake word detections being rejected if the potential detection occurs in the middle of the night. However, some users may use the system extensively or even primarily in the middle of the night. In this case, a personalized or customized model for the wake word detector may be desirable.

Although aspects of the embodiments described in the disclosure will focus, for the purpose of illustration, on a distributed system in which user utterances are received by a client device and audio data is transmitted to a separate network-based speech processing system for processing, one skilled in the art will appreciate that the techniques disclosed herein may be applied to any number of processes or applications performing speech processing. For example, a user device may include some or all of the modules, components, or other functionality to detect wake words using environmental and contextual. In addition, although embodiments described in this disclosure will focus, for the purpose of illustration, on detection of a key "word" or wake "word," one skilled in the art will appreciate that the techniques disclosed herein may be applied to detection of combinations of words, such as phrases or sentences. Various aspects of the disclosure will now be described with regard to certain examples and embodiments, which are intended to illustrate but not limit the disclosure.

Example Wake Word Detector

FIG. 1 depicts an example of a wake word detector 100 operating on various input data in order to determine whether a wake word is or is not present in an audio signal. The wake word detector 100 may be implemented as a specialized hardware component, or as a combination of software and a general computing device. The wake word detector may use a model 110 such as a statistical model or classifier trained to determine how likely it is that a given input includes a target word or phrase, such as a wake word.

In some implementations, wake word detection is the first step in a process that utilizes detected device-directed speech ("DDS"). As described above, a detection system may be configured to detect the presence of the wake word in a continuous audio input stream. The wake word may be used by a user to indicate that the user is addressing the computing device and that a spoken query or command will follow. For example, the user may say, "Phone, play me a Frank Sinatra song." The wake word in this utterance is "phone," and it precedes a "play music" command. When the wake word is detected, the subsequent utterance can be processed by an ASR system to recognize the speech and initiate other processing responsive to the spoken query or command.

The wake word detector 100 may calculate detection scores (e.g., confidence scores, likelihoods, probabilities) reflecting the likelihood that an utterance was directed at the computing device or, more generally, that an audio signal included the wake word. A false detection may occur when the detection score exceeds some operational threshold, also referred to as a detection threshold, even though the wake word was not spoken or the user was not trying to initiate communication. The input stream that follows the erroneously hypothesized utterance may be processed by the ASR system, and some undesirable or unpredictable action may be performed. For example, playback of media may be stopped even though the user was not addressing the computing device with a wake word and/or a command to stop playback.

In order to reduce or minimize false detections, the wake word detector 100 may use information in addition to acoustic features associated with the wake word when computing wake word detection scores. As shown in FIG. 1, the wake word detector 100 may use other acoustic information 102, environmental information 104, lexical and/or semantic information 106, contextual information 108, some combination thereof, etc. Illustratively, a user 150 may make an utterance in the presence of a device that implements the wake word detector 100. The device may capture or record sound that corresponds to the user's utterance, and generate an audio signal of the sound. The audio signal may be processed by various components of the device. One component may extract acoustic features from the signal that can be used to detect evidence of the wake word in the signal. In addition, features regarding the acoustic properties of the utterance in general may be extracted, such as prosody, energy, speaking rate, and the like. The same component or some other component can extract environmental features from the signal that can be used to determine the level and character of environmental noise, the location of the input device relative to the user 150, etc. An ASR module 120 can generate ASR results from the audio signal, such as one or more transcriptions of the utterance. An NLU module 122 can generate NLU results based on the ASR results, such as a semantic interpretation of the utterance. Contextual features may also be provided to or obtained by the wake word detector 100, such as the date and time, the geographic location of the device, and the like.

NLU results can be important to differentiate between audio signals that include device-directed speech and audio signals that include the wake word but which do not include actual device-directed speech. An audio signal that includes device-directed speech typically includes the wake word and a subsequent spoken command or other user intent recognizable to a speech processing system. However, a user may use the wake word without intending to address the device. A wake word detector that incorporates NLU results or other linguistic information derived from the audio signal can more effectively differentiate between such usages of the wake word. In the example above, the wake word is "phone," and the user has said "Phone, play me a Frank Sinatra song," which includes a spoken "play music" command that is recognizable to the speech processing system as a valid user intent. Because a valid, actionable user intent can be recognized in the audio signal by an NLU module, the wake word detector 100 implementing the wake word detection model 110 described in greater detail below can properly trigger a wake word detection. In some cases, the user may make an utterance that includes the wake word but which is not actually directed at the device. For example, the user may say "My phone needs to be charged." An NLU module 122 would not recognize a valid user intent actionable by a speech processing system in such an utterance. This result can be leveraged by the wake word detector 100 to suppress detection of the wake word even though the wake word itself was spoken. Thus, the particular word used as the wake word may only be treated as the wake word in the proper linguistic context; other uses of the particular word can be treated as though the wake word was not spoken. In this way, computing resources can be conserved that would otherwise be used to generate follow-up dialogs or execute incorrect processes, and the user experience with the system will not be negatively affected by a false detection.

The wake word detection model 110 may be a classifier trained to accept some or all of the features described above and determine whether the wake word is present in the audio signal. The classifier may be a statistical classifier or a combination of classifiers, including hidden Markov models ("HMMs"), support vector machines ("SVMs"), deep neural networks ("DNNs"), and the like. Advantageously, by using the variety of acoustic, environmental, and contextual information and ASR/NLU results as described above, the model can holistically determine a detection score with respect to the context and environment in which a potential utterance was spoken, rather than focusing only on detecting acoustic features of the wake word itself within the audio signal. This holistic approach can provide accurate results in a wider range of environments and contexts than a conventional wake word detector, allow the implementation of a rule-based framework for triggering detections as described below, etc.

In some embodiments, the model 110 may be or include a probabilistic logic network, such as a Markov logic network ("MLN"). For example, an MLM can be generated and weights for its constituent rules can be learned based on training data. Feature discovery techniques, such as decision trees, can be used to learn potential rules (e.g., paths in decision trees). In some embodiments, the rules may be reviewed and verified by system administrators or analysts before being added to the model. In addition, the efficacy of each rule may be monitored over time to determine whether the basis for the rule (e.g., the underlying model for the particular rule) is degrading. If so, system administrators or analysts may be notified to take corrective action. In some embodiments, the efficacy of the rules as a function of users may be monitored to detect salient groups of users for which a set of rules works particularly well or incorrectly. In further embodiments, users may be provided with a set (e.g., 4 or 5) of predetermined rules that can be activated or deactivated (e.g., using a configuration application). In this way, customers may be allowed to use custom combinations of rules.

In one specific, non-limiting example, the model 110 may take input that includes features weighted according to some predetermined or dynamically determined weighting. For example, the contextual information that is used may include the current time of day. The time of day may be weighted such that it is factored into the wake word detection to a lesser extent than other information or features, such as acoustic or environmental features extracted from the audio signal. Nevertheless, the time of day can affect the wake word detection process, such as when a low- or moderate-confidence detection would otherwise be triggered at a time of day that the user is expected to be sleeping. In this case, by factoring in the time of day, the detection may be suppressed (e.g. using probabilistic logic rules) or the detection score may fail to meet or exceed the detection threshold (e.g., using a statistical model). Because the time of day is weighted appropriately, a higher-confidence detection may still be triggered, even at a time of day that the user is expected to be sleeping.

As described in greater detail below, the model (whether a statistical model, probabilistic logic network, or some combination thereof) may be customized for a particular user. For example, data regarding the user's prior use of the wake word detection feature may be stored as usage history. The detection model may be customized or generated based on the usage history. In the example above, the detection model generated for the user may produce different results using the same input than a detection model generated for a second user who typically sleeps at different times than the first user, or who otherwise uses the wake word feature at different times that the first user.

Example Networked Speech Processing Environment

Figure 2:
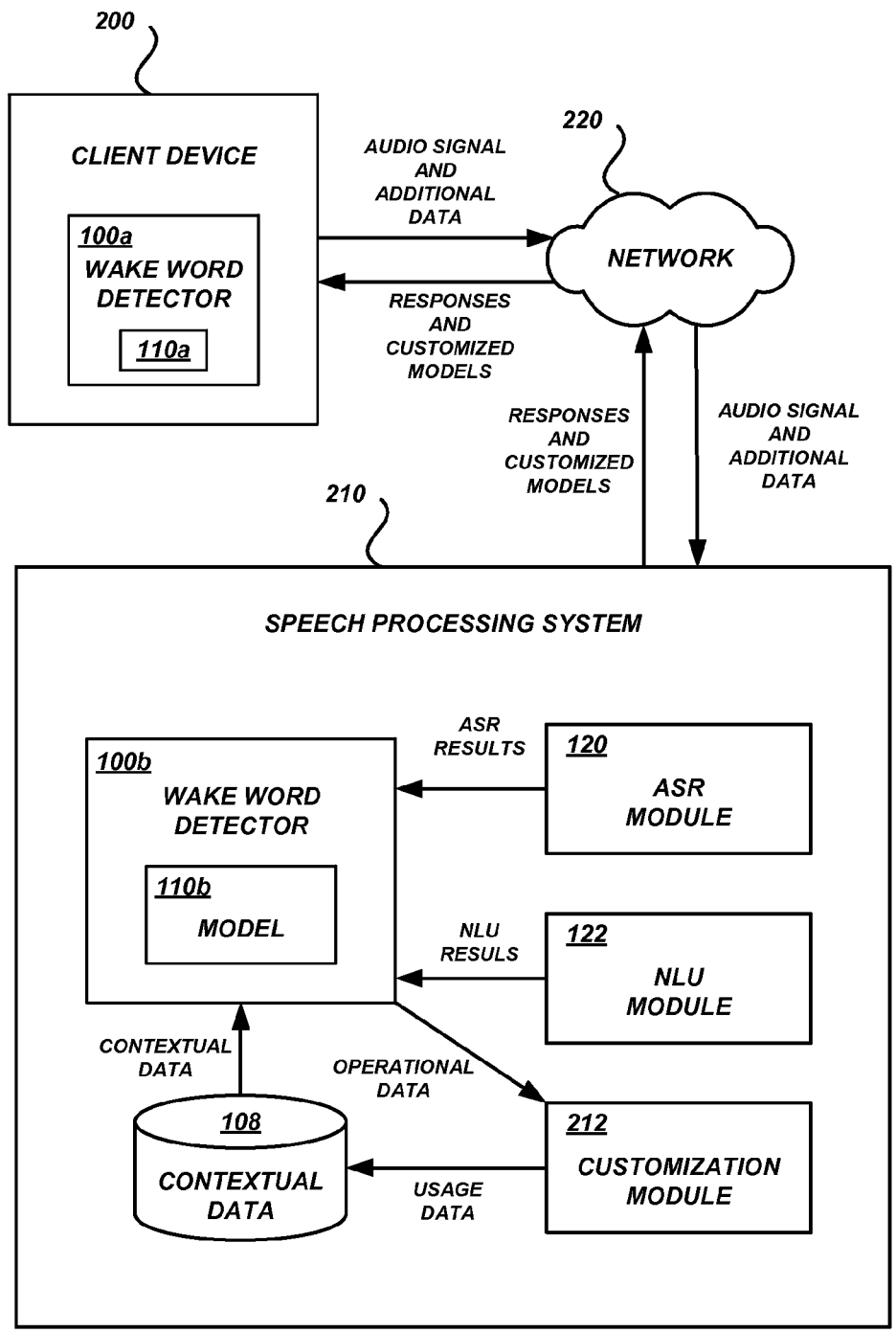
FIG. 2 is a diagram of an illustrative network environment in which aspects of the present disclosure may be implemented.

FIG. 2 illustrates an example network environment in which aspects of the present disclosure may be implemented. In particular, FIG. 2 shows a client device 200 and a speech processing system 210 in communication via a communication network 220. As shown, the client device 200 and the speech processing system 210 may each implement a wake word detector 100a and 100b, thereby providing multi-tiered wake word detection to improve accuracy and minimize latency. These benefits can be obtained by leveraging the client-side wake word detector 100a to reject most true negative inputs, while also leveraging the substantial resources available to the server-side wake word detector 100b to provide more extensive processing and higher detection accuracy.

The client device 200 can correspond to a wide variety of electronic devices. In some embodiments, the client device 200 may be a computing device that includes one or more processors and a memory which may contain software applications executed by the processors. The client device 200 may include or be in communication with an audio input component for accepting speech input on which to perform wake word detection and speech recognition, such as a microphone. The client device 200 may also include or be in communication with an output component for presenting responses or other information from the speech processing system 210, such as a speaker or display screen. The client device 200 may include hardware components and/or software for establishing communications over wireless communication networks or directly with other computing devices. Illustratively, the client device 200 may be a mobile device, such as a mobile phone, personal digital assistant ("PDA"), wearable communication device (e.g., "smart watch" or "smart eyewear"), mobile gaming device, media player, electronic book reader, tablet computer, laptop computer, or the like. In some embodiments, the client device may be a substantially stationary device, such as a television with program execution capabilities and network connectivity (e.g., "smart TV"), set-top box, gaming console, home entertainment system, desktop computer, server computer, or the like.

As shown in FIG. 2, an audio signal (or data derived therefrom) and additional data may be provided to a speech processing system 210. The speech processing system 210 can be a network-accessible system in communication with the client device 200 via a communication network 220, such as a cellular telephone network or the Internet. A user may use the client device 200 to submit utterances, receive information, and initiate various processes, either on the client device or at the speech processing system 210. For example, the user can issue spoken commands to the client device in order to search for plane tickets, set timers, listen to music, initiate phone calls, set calendar appointments, etc.

In addition to the wake word detector 100b, the speech processing system 210 may include an ASR module 120 that performs automatic speech recognition on audio data regarding user utterances and an NLU module 122 that performs natural language understanding on transcriptions of user utterances. The speech processing system 210 may also include a contextual data source 108 that can provide or store received contextual data as described above, and other data including information regarding prior usage of the speech processing system by the current user or other users. The speech processing system 210 may also include a customization module 212 that can generate or modify wake word detection models for use by particular users or groups of users. The speech processing system 210 may include various other modules or components, as will be appreciated by those of skill in the relevant art. For example the speech processing system 210 may include a dialog manager that manages user interaction with the speech processing system 210 and initiates various dialog acts, a natural language generation ("NLG") module that converts certain dialog acts into user-understandable communications (e.g., text that can be "read" to the user by a text-to-speech or "TTS" component), application modules that execute spoken commands interpreted by the ASR module 120 and/or NLU module 122, and the like.

The speech processing system 210 may include any number of server computing devices, desktop computing devices, mainframe computers, and the like. Each individual device may implement one of the modules or components of the speech processing system 210. In some embodiments, the speech processing system 210 can include several devices physically or logically grouped together to implement one of the modules or components of the speech processing system 210. For example, the speech processing system 210 can include various modules and components combined on a single device, multiple instances of a single module or component, etc. In one specific, non-limiting embodiment, the speech processing system 210 may include a server or group of servers configured with an ASR module 120, a server or group of servers configured with an NLU module 122, a server or group of servers configured with a wake word detector 100, etc. In multi-device implementations, the various devices of the speech processing system 210 may communicate via an internal communication network, such as a corporate or university network configured as a local area network ("LAN") or a wide area network ("WAN"). In some cases, the devices of the speech processing system 210 may communicate over an external network, such as the Internet, or a combination of internal and external networks.

In some embodiments, the features and services provided by the speech processing system 210 may be implemented as web services consumable via a communication network. In further embodiments, the speech processing system 210 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Detecting a Wake Word Using Environmental and Contextual Information

Figure 3:
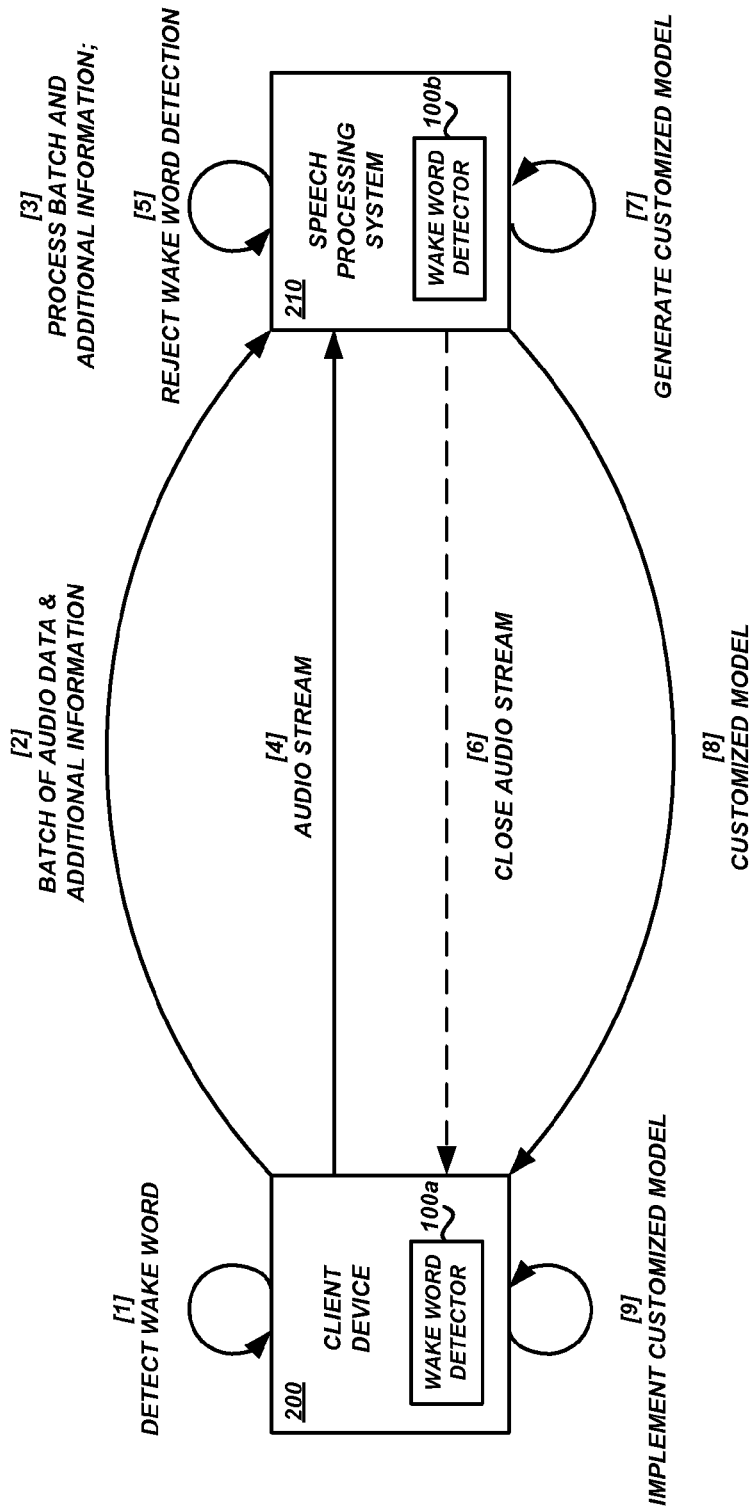
FIG. 3 is a diagram of illustrative interactions between a user device and a network-based speech processing system processing audio data to detect the presence of wake words in the audio.

FIG. 3 illustrates example interactions between a client-side wake word detector 100a implemented by a client device 200 and a server-side wake word detector 100b implemented by a network-based speech processing system 210. The client-side wake word detector 100a may trigger detection of a wake word in an audio stream at [1]. The client-side wake word detector 100a can use process 400, illustrated in FIG. 4 and described below, in order to detect the wake word, or the client-side wake word detector 100a can use some other process.

The client device 100 can provide audio data and additional information to the speech processing system 210 at [2]. The audio data may include the audio signal within which the wake word was detected by the client-side wake word detector 100a. This audio signal (or data derived therefrom) can be proved in a discrete batch or chunk because it has already been generated and operated on by the wake word detector 100a. For example, the audio signal may not be streamed over a period of time corresponding to the length of the audio signal, as would be the case in a real-time streaming signal. Instead, the entire audio signal in which the wake word was detected can be provided at once. In addition, the client device 200 can provide information regarding the exact or approximate starting and/or ending position of the wake word within the audio signal (e.g., pointers or time stamps), information regarding any detection score computed by the client-side wake word detector 100a, contextual information such as date, time, or location, and the like.

The speech processing system 210 can process the audio data and additional information at [3] in order to determine whether the wake word was spoken. Illustratively, the server-side wake word detector 100b can use process 400, illustrated in FIG. 4, to process the audio data and additional information.

Figure 4:
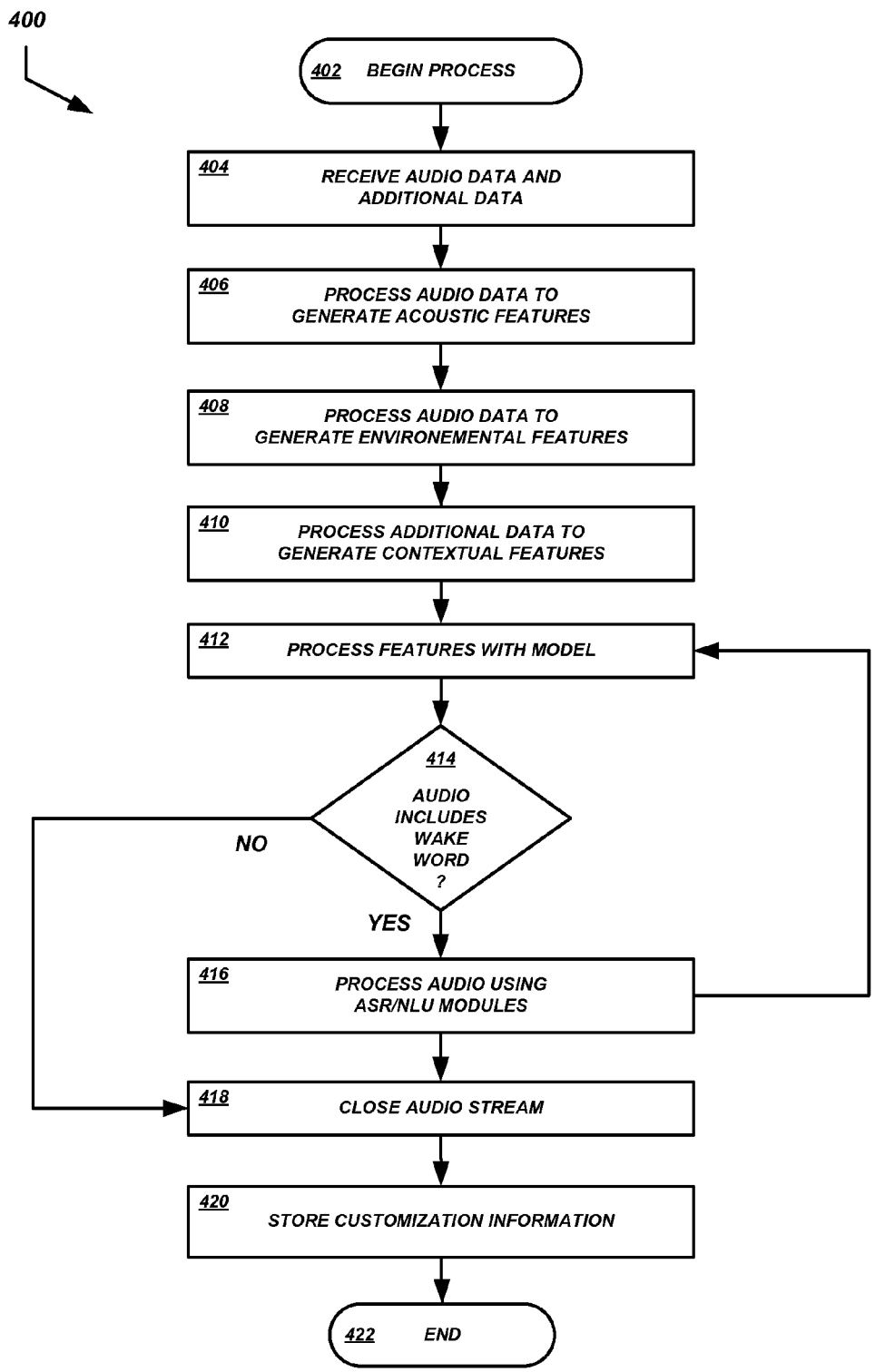
FIG. 4 is a flow diagram of an illustrative process for processing utterance audio, environmental audio, and contextual data to detect the presence of a wake word.

The process 400 illustrated in FIG. 4 can begin at block 402. In some embodiments, the process 400 may be embodied in a set of executable program instructions stored on a computer-readable medium, such as one or more disk drives, of a computing device (e.g., a server computing device of the speech processing system 210, a client device 200, etc.). When the process 400 is initiated, the executable program instructions may be loaded into the memory of a computing device and may be executed by one or more processors in communication with the computing device.

At block 404, a wake word detector or some other module or component can receive audio data and additional data. In the example illustrated in FIG. 3, audio data and additional data are received at the speech processing system 210 from the client device 200 at [3]. At blocks 406, 408, and 410, the wake word detector or some other module or component can process the audio data and additional data to generate acoustic features, environmental features, and/or contextual features, as described above, for use by the wake word detection model.

At block 412, the wake word detector can use the wake word detection model to process the features extracted above. The wake word detection model may generate a detection score using the features. Illustratively, the detection score may indicate the likelihood that the audio data includes the wake word. At decision block 414, if the detection score exceeds some threshold, satisfies some rule framework, or otherwise satisfies some predetermined or dynamically determined criteria, then a wake word detection may be triggered and the process 400 can proceed to bock 416.

At block 416, the ASR module 120 and NLU module 122 can proceed to produce ASR and NLU results based on the audio signal streamed to the speech processing system 210 in response to detection of the wake word by the client-side wake word detector 100a. As described above and illustrated in FIG. 3, the client device 200 can stream an audio signal to the speech processing system 210 at [4] so that the speech processing system 210 can generate speech recognition results, respond to a recognized user utterance, etc. The audio stream may be provided at [4] without waiting for a subsequent wake word detection by the server-side wake word detector 100b because the client-side wake word detector 100a has already detected the wake word at [1]. In some embodiments, the audio stream provided at [4] may be a real-time or substantially real-time stream that is separate from the "batch" audio data provided at [2]. In other embodiments, the audio stream may be a continuation of an audio stream initiated at [2].

As shown in FIG. 3, the server-side wake word detector may determine at [5] that the wake word was not uttered. This determination may come before or after the audio stream at [4] is initiated. If the determination occurs after the audio stream is initiated, then the speech processing system can close the audio stream, as shown in FIG. 3 at [6] and in FIG. 4 at block 416. The stream can be closed to reduce or eliminate the chance of undesirable actions being performed, to preserve user privacy, etc. In some embodiments, the speech processing system 210 may maintain wake word audio and/or features extracted from the wake word audio in order to train or otherwise improve the wake word detection model, as described in greater detail below. If the server-side wake word detector determines that the wake word was not uttered, the audio that would otherwise be save may in some cases be deleted to preserve user privacy. Acoustic features extracted from the audio may nevertheless be stored in order to improve the wake word detection model and reduce future false detections when similar acoustic features are extracted from an audio stream.

In some embodiments, as shown in FIG. 4, the ASR module 120 and/or NLU module 122 may provide ASR and/or NLU results at block 412 for use as an additional input feature to the wake word detection model. The speech recognition results 412 may be generated subsequent to an initial wake word detection (e.g., by the server-side wake word detector). In this way, the wake word detector can determine whether the wake word was spoken based at least partly on recognition results for the time after the wake word was determined to be spoken. If the speech recognition results do not correspond to intents that the speech processing system is configured to recognize or act on, then the wake word detector may determine that the wake word was not spoken, and may then close the audio stream.

In some embodiments, speech recognition results may be generated for the initial batch of audio data (or some portion thereof) that was provided to the speech processing system 210 at [2]. Because the audio that corresponds to the wake word detected by the client-side wake word detector 100a is provided to the speech processing system 210 in its entirety, the speech processing system 210 can perform speech recognition on the audio to generate a transcript. The transcript can be analyzed for the presence of the keyword, provided to the wake word detection model as an additional input feature, or used in some other manner. In some embodiments, information about the starting and/or ending point of the wake word in the audio batch may be used to perform speech recognition on portions of the audio batch (e.g., in parallel processes). For example, speech recognition may be performed forward from the starting point, backward from the ending point, etc.

Customizing a Wake Word Detection Model

Wake word detection models may be customized for particular users or groups of users. As shown in FIG. 4, information may be stored at block 420 for use in customizing wake word detection models. The information may include usage data, such as the audio provided by the client device 200, features extracted from the audio, ASR and/or NLU results generated using the audio or a subsequent audio stream, contextual information, and the like. The customization module 212 or some other module or component can use this information to retrain or update the wake word detection model, or to generate a new wake word detection model. In this way, the wake word detection model may be based on real-world data observed by the system that uses the model. As shown in FIG. 3, a customized wake word detection model may be provided to the user device 200 at [8]. The user device 200 can implement the customized wake word detection model at [9] by, e.g., replacing an existing detection model with the customized wake word detection mode.

Figure 5:
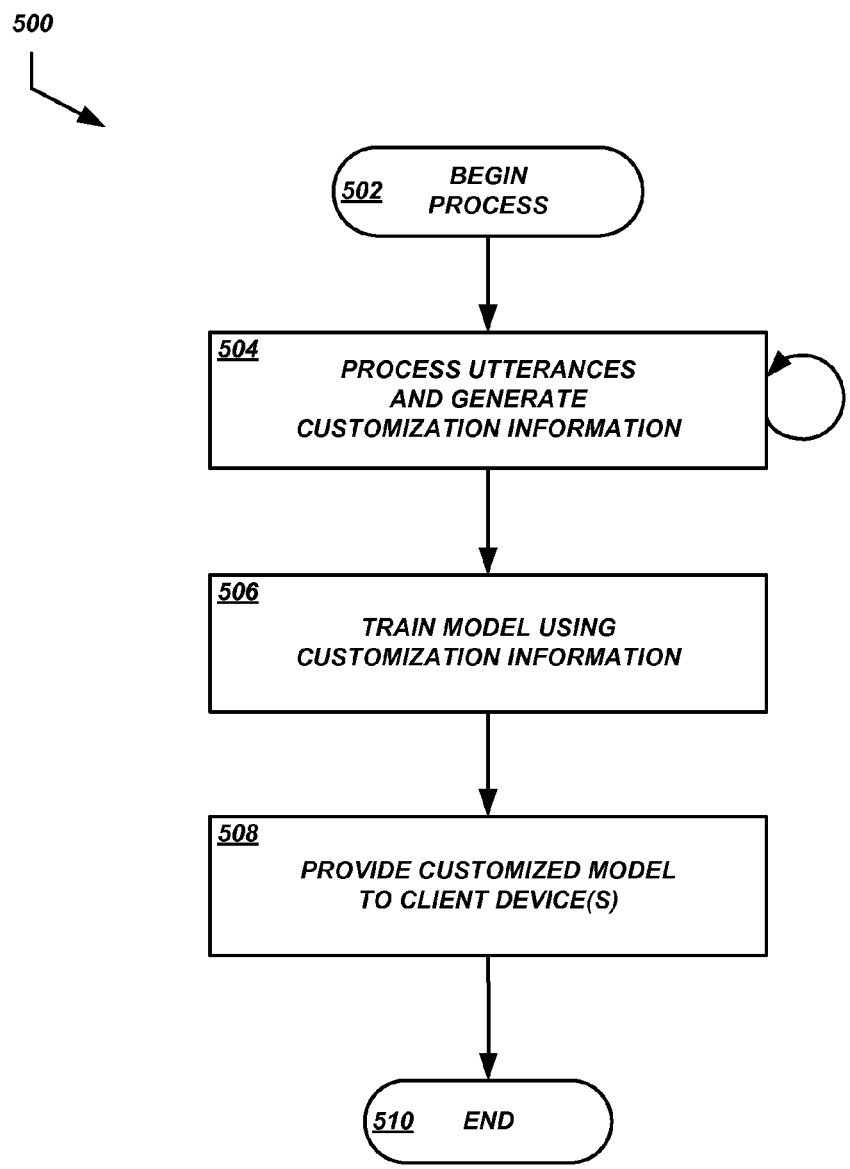
FIG. 5 is a flow diagram of an illustrative process for generating a personalized wake word detection classifier.

FIG. 5 illustrates a process 500 that can be performed to generate customized detection models for individual users, or for groups of users that exhibit similar wake word detection system usage patterns (e.g., similar contextual information, similar environmental information, similar acoustic information, some combination thereof, etc.). The process 500 can begin at block 502. In some embodiments, the process 500 may be embodied in a set of executable program instructions stored on a computer-readable medium, such as one or more disk drives, of a computing device (e.g., a server computing device of the speech processing system 210). When the process 500 is initiated, the executable program instructions may be loaded into the memory of a computing device and may be executed by one or more processors in communication with the computing device.

At block 504, the speech processing system 210 can process utterances and generate customization information, as described in greater detail above. In some embodiments, the customization information includes data regarding wake word detection performance, such as the audio signal and additional data received from the client device 200, the features generated from the signal and data, the scores or other output generated by the wake word detector 100b, etc.

At block 506, the customization model 212 or some other module or component of the speech processing system 210 can train a wake word detection model based on the customization information. For example, training data can be generated using the customization information and a model training process can be run using the generated training data.

At block 508, the customization model 212 or some other module or component of the speech processing system 210 can provide the customized model to one or more client devices for use. The models may be provided in response to requests from client devices 200 (e.g., scheduled checks for updated models), at the beginning or end of a speech recognition session, at the discretion of the speech processing system 210, etc.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
obtain from a client device:
an audio signal, wherein a first portion of the audio signal comprises audio data likely corresponding to a wake word, and wherein a second portion of the audio signal does not comprise audio data likely corresponding to the wake word;
contextual information associated with the audio signal; and
information indicating the first portion of the audio signal comprises audio data likely corresponding to the wake word;
obtain acoustic information and environmental information from the first portion of the audio signal, wherein the acoustic information reflects one or more characteristics of a voice in the audio signal, and wherein the environmental information reflects one or more characteristics of an environment in which sound in the audio signal was recorded;
determine whether audio data corresponding to the wake word is present in the audio signal using a server-side detection model configured to generate a detection score using the contextual information, the environmental information, the acoustic information, and natural language understanding results generated based at least partly on at least one of the audio signal or a subsequent audio signal, wherein a detection score greater than a detection threshold indicates that audio data corresponding to the wake word is present in the audio signal;
in response to determining that audio data corresponding to the wake word is present in the audio signal, perform an action corresponding to a request in the audio signal; and
in response to determining that audio data corresponding to the wake word is not present in the audio signal, close an audio signal stream from the client device.

2. The system of claim 1, wherein the server-side detection model comprises a statistical classifier or a probabilistic logic network.

3. The system of claim 1, wherein the server-side detection model is further configured to generate the detection score using automatic speech recognition results generated based at least partly on at least one of the audio signal or the subsequent audio signal.

4. The system of claim 1, wherein the one or more processors are further programmed to:
store information regarding determining whether audio data corresponding to the wake word is present in the audio signal;
train a customized client-side detection model using training data based at least partly on the information regarding determining whether audio data corresponding to the wake word is present in the audio signal; and
transmit the customized client-side detection model to the client device.

5. A computer-implemented method comprising:
as implemented by one or more computing devices configured to execute specific instructions,
obtaining from a client device:
audio input comprising a plurality of portions of audio data, wherein less than all of the plurality of portions of audio data comprise audio data corresponding to a keyword detected by the client device;
contextual information associated with the audio input; and
information indicating a portion of audio data, of the plurality of portions of the audio data, that likely corresponds to the keyword;
obtaining acoustic information and environmental information from the portion of audio data that likely corresponds to the keyword;
determining that the portion of audio data corresponds to the keyword using a detection model configured to generate a detection score using the audio input, the contextual information, the environmental information, and the acoustic information, wherein a detection score satisfying a detection threshold indicates audio data corresponding to the keyword is present in the audio input; and performing an action corresponding to a request in the audio input.

6. The computer-implemented method of claim 5, wherein the detection model is trained using training data comprising contextual information, acoustic information, environmental information, and linguistic information.

7. The computer-implemented method of claim 5, wherein the acoustic information comprises natural language understanding results generated using the audio input.

8. The computer-implemented method of claim 5, wherein the acoustic information reflects one or more characteristics of a voice in the audio input.

9. The computer-implemented method of claim 5, wherein the environmental information reflects one or more characteristics of an environment in which sound in the audio input was captured.

10. The computer-implemented method of claim 5, wherein the contextual information reflects at least one of a time at which the audio input was generated, a geographic location of an audio input device, or a physical orientation of the audio input device with respect to a user.

11. The computer-implemented method of claim 5, wherein a detection score failing to satisfy the detection threshold indicates that the portion of the audio input does not correspond to the keyword.

12. The computer-implemented method of claim 5, wherein the detection model comprises a probabilistic logic network comprising a rule defined by one of a system administrator or a system user.

13. The computer-implemented method of claim 5, wherein the detection model comprises a probabilistic logic network comprising a rule automatically generated using a machine learning process.

14. The computer-implemented method of claim 5, further comprising:
storing information regarding use of the detection model to determine whether the portion of the audio input corresponds to the keyword; and
training a customized client-side detection model using training data based at least partly on the information regarding use of the detection model.

15. The computer-implemented method of claim 14, further comprising providing the customized client-side detection model to one or more client computing devices.

16. Non-transitory computer-readable storage comprising executable code that, when executed, causes one or more computing devices to perform a process comprising:
obtaining from a client device:
audio input, wherein less than all of the audio input comprises audio data likely corresponding to a keyword;
contextual information associated with the audio input; and
information indicating a portion of audio input, of a plurality of portions of the audio input, that likely corresponds to the keyword;
obtaining acoustic information and environmental information from the portion of the audio input;
determining that audio data corresponding to the keyword is present in the audio input using a detection model configured to generate a detection score using the audio input, the contextual information, the environmental information, and the acoustic information, wherein a detection score satisfying a detection threshold indicates audio data corresponding to the keyword is present in the audio input; and
performing an action corresponding to a request in the audio input.

17. The non-transitory computer-readable storage of claim 16, wherein the detection model is trained using training data comprising contextual information, acoustic information, environmental information, and linguistic information.

18. The non-transitory computer-readable storage of claim 16, wherein the acoustic information comprises natural language understanding results generated using the audio input.

19. The non-transitory computer-readable storage of claim 16, wherein the acoustic information reflects one or more characteristics of a voice in the audio input.

20. The non-transitory computer-readable storage of claim 16, wherein the environmental information reflects one or more characteristics of an environment in which a voice in the audio input was captured.

21. The non-transitory computer-readable storage of claim 16, wherein the contextual information reflects at least one of a time at which the audio input was generated, a geographic location of an input device, or a physical orientation of the input device with respect to a user.

22. The non-transitory computer-readable storage of claim 16, wherein a detection score failing to satisfy the detection threshold indicates that audio data corresponding to the keyword is not present in the audio input.

23. The non-transitory computer-readable storage of claim 16, the process further comprising:
storing information regarding use of the detection model to determine whether the portion of the audio input corresponds to the keyword; and
training a customized client-side detection model using training data based at least partly on the information regarding use of the detection model.

24. The computer-implemented method of claim 5, wherein the detection model is a server-side detection model.

25. The computer-implemented method of claim 5, wherein obtaining, from the client device, the audio input comprises obtaining the audio input in batches from the client device, wherein the batches of the audio input have previously been generated on the client device from an audio signal.

26. The computer-implemented method of claim 5, wherein determining whether the portion of the audio input corresponds to the keyword is based at least in part on the information regarding at least one of a start position or an end position of the portion of the audio input.

27. The system of claim 1, wherein the executable instructions to close the audio signal stream from the client device comprise executable instructions to at least: close a connection with the client device, reject audio data from the client device, or instruct the client device to stop transmitting audio data.

* * * * *